Figure 5:
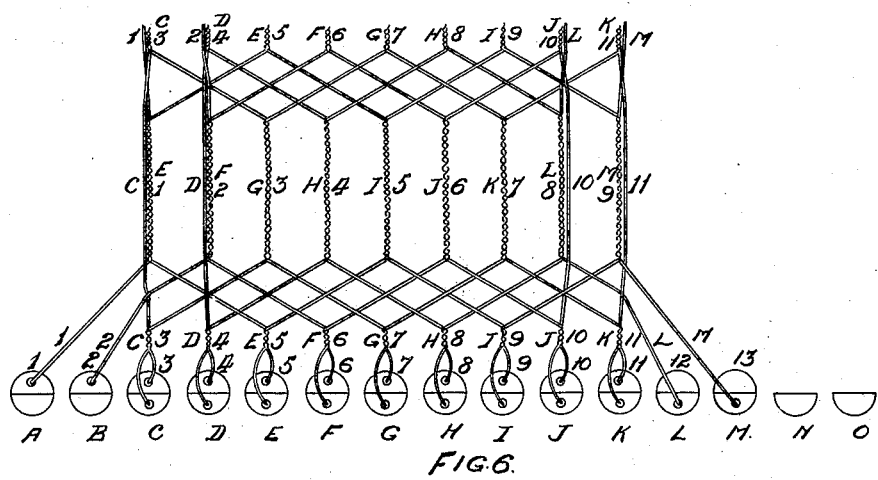

A. W. STOREY.
MANUFACTURE OF WOVEN WIRE NETTING.
APPLICATION FILED JUNE 14, 1909.
966,137.
Patented Aug. 2, 1910.
4 SHEETS—SHEET 1.
FIG. 1.
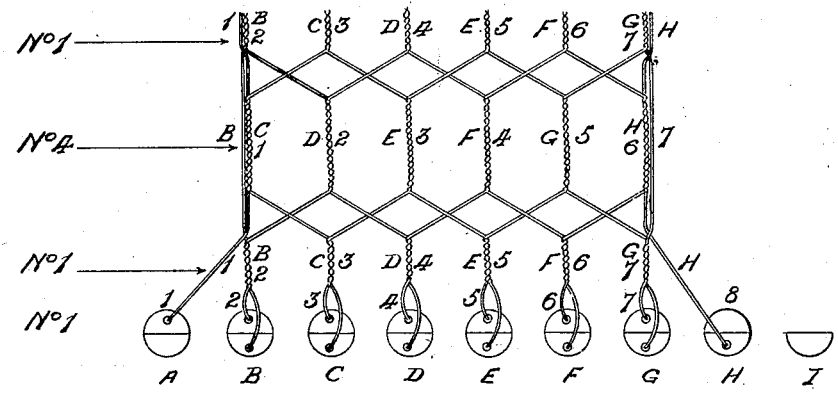
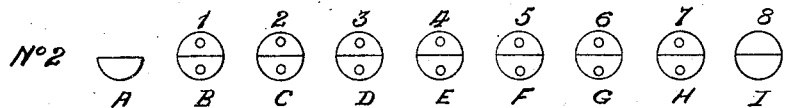
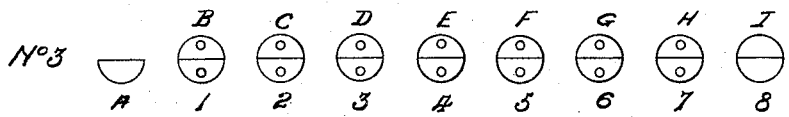
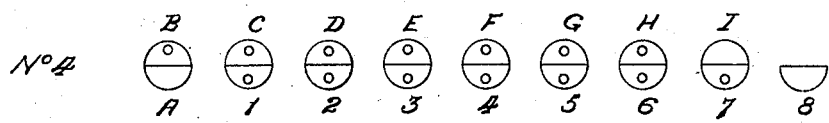
WITNESSES
W. P. Burke
John G. Percival
INVENTOR
Andrew William Storey
BY Wm Wallace White
ATTY A. W. STOREY.
MANUFACTURE OF WOVEN WIRE NETTING.
APPLICATION FILED JUNE 14, 1909.
966,137.
Patented Aug. 2, 1910.
4 SHEETS—SHEET 2.
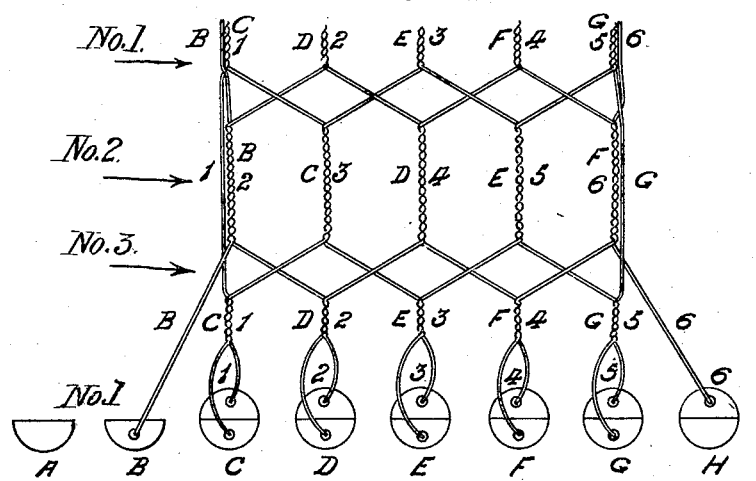
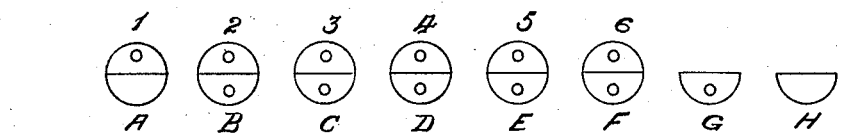
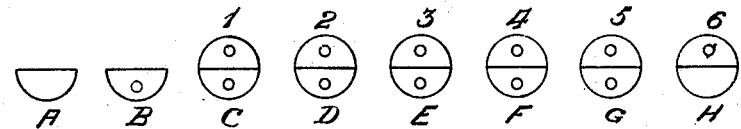
INVENTOR
Andrew William Storey
BY Wallace White
ATTY.
WITNESSES
W. P. Burke
John G. Percival

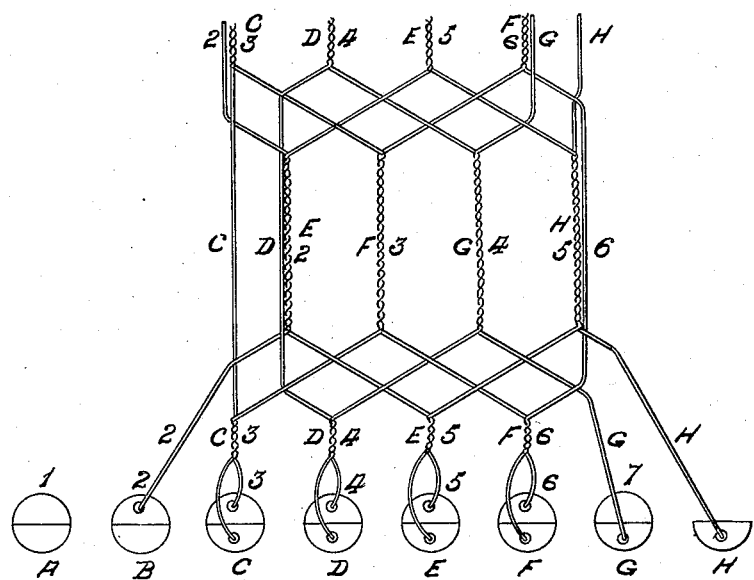
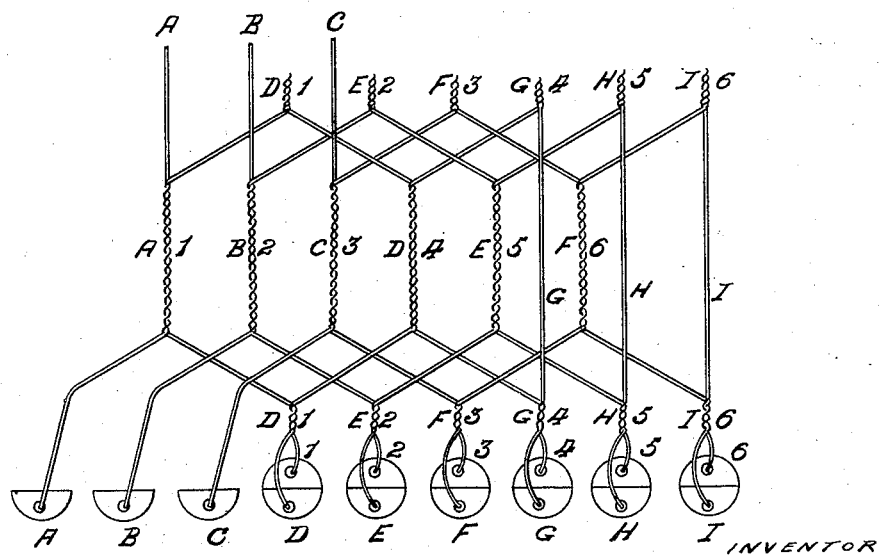

A. W. STOREY.
MANUFACTURE OF WOVEN WIRE NETTING.
APPLICATION FILED JUNE 14, 1909.

966,137.

Patented Aug. 2, 1910.
4 SHEETS—SHEET 4.

UNITED STATES PATENT OFFICE.

ANDREW WILLIAM STOREY, OF MANCHESTER, ENGLAND.

MANUFACTURE OF WOVEN-WIRE NETTING.

966,137.  Specification of Letters Patent.  Patented Aug. 2, 1910.

Application filed June 14, 1909. Serial No. 502,049.

*To all whom it may concern:*

Be it known that I, ANDREW WILLIAM STOREY, a subject of the King of Great Britain, residing at 45 Gaylor street, in the city of Manchester, England, have invented new and useful Improvements in the Manufacture of Woven-Wire Netting, of which the following is a specification.

My invention relates to improvements in the manufacture of woven wire netting and particularly to the weaving of wire netting commonly known as hen-pen netting, which usually has a hexagon or diamond mesh.

My invention consists of certain changes in the method of weaving such netting whereby I am enabled to make variations in the pattern of the netting and the form of its meshes and thus obtain an improved article of manufacture of a novel pattern or design and configuration.

In carrying my invention into effect I employ the usual or any known and suitable arrangement of weaving pinions mounted in halves in two sets of oppositely reciprocating slides or traverse bars and with reciprocating racks or equivalent means for rotating the pinions. In such arrangement each half pinion is threaded with wire throughout the entire series of pinions employed in forming the width of the fabric, and the traverse bars at each reciprocation move the two sets of wires and half pinions, one step, that is to say each wire and half pinion is moved opposite to the wire and half pinion next or nearest to it, before the next rotation takes place. This obviously requires one additional wire and single half pinion, over and above the number of pairs of wired half pinions employed, in order that the wires may intertwist when the pinions are rotated in pairs by the racks after the reciprocation of the traverse bars has taken place. I now arrange to have two or more additional single threaded or wired half pinions over and above the number of pairs of wired half pinions according to the number of wires to be crossed over at each step without intertwisting, and I also arrange that the traverse bars move the two sets of half pinions two or more steps so that each half pinion passes over an intermediate wired half pinion or pinions before it intertwists. I also prefer to cause a dwell of the traverse bars at any desired meeting or crossing place of the pinions, and to give a half turn to the pinions during such dwell in order to cause the wires to interlace and further to interlock the selvage wires. The necessary changes must obviously be made in the cams or equivalents which actuate the racks and traverse bars. The effect of these changes is to produce a wire netting of entirely novel design which may be varied according to the number of wired pinions passed over without intertwisting of the wires.

Figure 6:
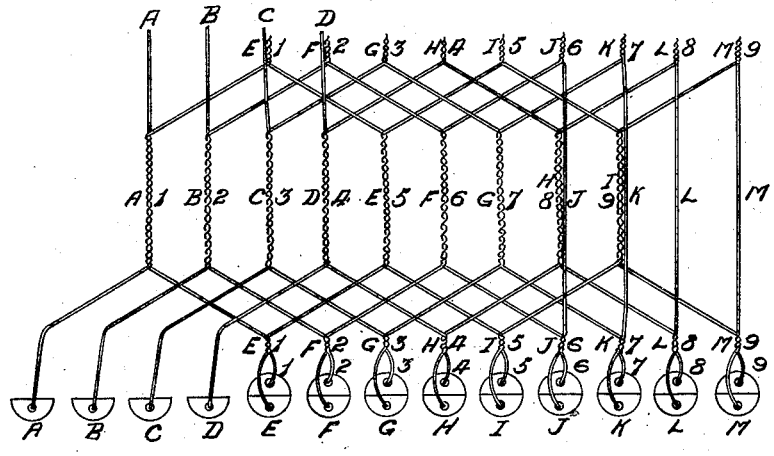

In the accompanying four sheets of drawings—Figure 1 illustrates the improved woven wire netting produced when one intermediate wired pinion is passed over without rotation and consequent intertwisting of the wires, but with interlacing movements and interlocking at both selvages. Fig. 2 illustrates the same design but without interlacing movements and consequent interlocking at the selvages. Fig. 3 illustrates my improved wire netting when two intermediate wired pinions are passed over with interlacing movements. Fig. 4 illustrates the same design as Fig. 3 but produced by using the extra wired half pinions in different positions. Fig. 5 illustrates my improved wire netting when three intermediate wired pinions are crossed over without intertwisting. Fig. 6 illustrates the same design as Fig. 5 but produced by using the extra wired half pinions in different positions.

In the drawings I have lettered the half pinions in the front traverse bars in alphabetical order from left to right, and have numbered consecutively the half pinions in the back traverse bars which contain the racks by which the pairs of pinions are rotated as required.

The several figures represent different designs of my improved wire netting produced by movements of the traverse bars and racks with the setting of the wired half pinions as indicated by the respective diagrams below such figures. In each case the letters and numbers on the wires in the design correspond with the same letters and numbers on the diagrams of the pinions, and thus the movements both of intertwisting and interlacing the wires can be readily traced, even in those designs in which the diagrams of the movements of the pinions are not given in full.

In Fig. 1, I have shown the two extra wired half pinions H and 1 respectively placed one at each edge of the netting and one in each traverse bar, and have shown four diagrams indicating the movements of the traverse bars with the pinions. The first diagram No. 1 shows the starting position and setting of the pinions and consequent position of the wires. Intertwisting of the wires, by rotation of the pairs of wired pinions, may be carried on for any desired number of turns according to the length of twisted strands desired. After this, the traverse bars move the pinions one step into the position shown in No. 2 diagram, when a half turn is imparted to the pinions by the racks to cause the wires to interlock at the selvages and to interlace as shown in diagram No. 3 but not to intertwist. The traverse bars then move the pinions into the position shown in diagram No. 4, when the racks rotate the pinions and intertwist the pairs of wires, thus again forming the twisted strands. The next operation brings the pinions back to No. 3 position, when the wires are interlaced and the selvage wires interlocked bringing the pinions into the No. 2 position, and thence by the movement of the traverse bars back to No. 1 position where the intertwisting is resumed thus completing the cycle necessary for the formation of one complete set of meshes as shown in Fig. 1.

In Fig. 2 the setting of the wired half pinions is substantially the same, but they are shown in different positions, and further, as shown by the three diagrams Nos. 1, 2 and 3 respectively the selvage wires are not interlocked by any interlacing due to movements of the pinions. In the diagram No. 1 it will be seen that the two extra wired pinions (B and 6) project at each end of the pairs of wired pinions and one in each traverse bar, and in diagram No. 2 there are still two pinions projecting after the motion of the traverse bars, but they are now G and 1, and in diagram No. 3 the traverse bars have been returned to their original position, with B and 6 again projecting. The effect of this setting in conjunction with the movements of the pinions is to produce at each edge of the fabric, two distinct selvage wires running concurrently and intertwisting in alternate meshes, and thus forming a much stronger and neater selvage than could be obtained by placing the two extra wired pinions at one end of the pairs of wired pinions after the manner and giving a similar result at the selvage as that shown in Figs. 4 and 6.

In Fig. 3, I show the setting of the wired half pinions and position of the wires and the starting position to produce the netting shown when two intermediate wired pinions are crossed over without intertwisting but with interlacing movements of the pinions.

In Fig. 4, I show the same design of netting but produced by a different setting of the pinions, and consequent different position of the wires, two intermediate wired pinions being crossed over without either intertwisting or interlacing movements of the pinions.

In Fig. 5, I show the design of my improved wire netting produced when three intermediate wired pinions are crossed over without intertwisting but with interlacing movements of the pinions.

In Fig. 6, I show the same design of wire netting as in Fig. 5 but with a different setting of the pinions and consequent different position of the wires, the three intermediate wired pinions in this instance being crossed over without either interlacing or intertwisting.

In each design I may arrange the cams or equivalents which actuate the traverse bars in such a manner as to cause a dwell at every crossing or meeting place, even though only one intermediate pinion is passed over without intertwisting, while each pair of wired half pinions receives a half turn by the racks so as to cause the crossing wires to interlace, but without intertwisting. The effect of this interlacing of the wires at each crossing is to interlock the selvage wires and thus impart greater rigidity to the netting and a neater finish at each selvage. When two or more intermediate wired half pinions are crossed over I also prefer to arrange the cams or equivalents which actuate the traverse bars in such a manner as to cause a dwell, while the half pinions receive a half turn by the rack so as to cause the crossing wires to interlace at every desired crossing or meeting place, the necessary change being made in the cam or equivalent so as to give the required length of slide according to the mesh and the number of intermediate wired half pinions to be crossed.

Throughout my specification I have described imparting a "half turn" to the pinions when it is desired to simply interlace the wires without intertwisting them; but I wish it to be understood that under certain conditions it will be possible to impart a full turn without causing intertwisting of the wires, and I therefore desire to reserve the right of making either such full turn if required or a half turn as may be more convenient to cause the desired interlacing of the wires without intertwisting them.

I am aware that it has previously been proposed in changing say for example from weaving wire netting with one-inch meshes to a weave with two-inch meshes to omit to thread wires through the alternate half pinions; but in such a case the wires are omitted from the half pinions which have to be crossed, whereas in my method all half pinions are threaded with wires without exception from any desired pinion at or near one selvage to any desired pinion at or near the other selvage throughout the full width of the wire netting, and further the wires are preferably all interlaced where they cross. I am also aware that it has been proposed to produce a continuous web of wire work wherein all the meshes produced are of the same size but the wires forming the said meshes are crossed in part of the width in such a manner as to cause the web to present smaller openings at this part than at the other part. In such proposed construction no alteration was to be made in existing machines, but a wire was to be threaded through every half pinion at that part of the machine where the small openings in the mesh were to be produced, and through every alternate half pinion on each pinion plate, where the large openings were to be formed. The pinion plates were to be moved through twice the distance between each pair of pinions and it was proposed to finish the edges in the ordinary way. In the foregoing construction the object was to produce a mixed mesh wire netting suitable for poultry houses, and the like inclosures, the smaller openings being placed next the ground to prevent smaller birds or animals from passing through; whereas in my method of weaving there is no mixed mesh, but there is one uniform weave of wire across the full width of the netting. Also in my method of weaving as already stated all half pinions are threaded with wires without exception from any desired pinion at or near one selvage to any desired pinion at or near the other selvage throughout the full width of the wire netting, and further the wires are preferably all interlaced where they cross. Again by increasing and varying the number of intertwisting coils I produce novel ornamental effects as illustrated in the examples shown on the drawing, my improved wire netting being particularly applicable for reinforcing plate and other glass, as well as for fencing and various other useful purposes.

Having now particularly described and ascertained the nature of my said invention and in what manner the same is to be performed I declare that what I claim is:—

1. The improved method of manufacturing woven wire netting which consists in modifying the form of the ordinary hexagonal mesh by reciprocating the wired half pinions, after intertwisting, more than one stage before again intertwisting, substantially as and for the purpose herein set forth.

2. The improved method of manufacturing woven wire netting which consists in modifying the form of the ordinary hexagonal mesh by reciprocating the wired half pinions, after intertwisting, more than one stage before again intertwisting, and interlacing the wires at the points where they cross without intertwisting, by causing a dwell at each crossing point, and by giving the pinions a half turn during each dwell, substantially as and for the purpose herein set forth.

3. The improved method of manufacturing woven wire netting which consists in modifying the form of the ordinary hexagonal mesh by reciprocating the wired half pinions, after intertwisting, more than one stage before again intertwisting, interlacing the wires at every crossing point, and binding in at each edge of the fabric two wires running concurrently with the selvage wire and intertwisting in alternate meshes, thus forming improved selvages, substantially as and for the purpose herein set forth.

In testimony whereof I have signed my name to this specification in the presence of two subscribing witnesses.

ANDREW WILLIAM STOREY.

Witnesses:
HENRY BERNOULLI BARLORO,
HERBERT ROWLAND ABBEY.